(12) United States Patent
Lakshmanan et al.

(10) Patent No.: US 7,979,578 B2
(45) Date of Patent: Jul. 12, 2011

(54) DYNAMIC AND EVOLUTIONARY PLACEMENT IN AN EVENT-DRIVEN COMPONENT-ORIENTED NETWORK DATA PROCESSING SYSTEM

(75) Inventors: Geetika T. Lakshmanan, Cambridge, MA (US); Robert E. Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 12/552,565

(22) Filed: Sep. 2, 2009

(65) Prior Publication Data

US 2011/0055426 A1   Mar. 3, 2011

(51) Int. Cl.
*G06F 15/173* (2006.01)
(52) U.S. Cl. ......... 709/238; 709/223; 709/224; 709/239
(58) Field of Classification Search ................... 709/223, 709/224, 238, 239
See application file for complete search history.

(56) References Cited

U.S. PATENT DOCUMENTS

| | | | |
|---|---|---|---|
| 5,848,403 A | 12/1998 | Gabriner et al. | |
| 5,946,673 A | 8/1999 | Francone et al. | |
| 6,490,566 B1 | 12/2002 | Schmidt | |
| 6,882,988 B2 | 4/2005 | Subbu et al. | |
| 6,904,335 B2 | 6/2005 | Solomon | |
| 7,277,876 B2 | 10/2007 | Solomon | |
| 7,305,371 B2 | 12/2007 | Brueckner et al. | |
| 7,827,268 B2 * | 11/2010 | Monier et al. | 709/223 |
| 2003/0069865 A1 | 4/2003 | Subbu et al. | |
| 2004/0083129 A1 | 4/2004 | Herz | |
| 2006/0085558 A1 | 4/2006 | Solomon | |
| 2006/0167917 A1 | 7/2006 | Solomon | |
| 2008/0040529 A1 * | 2/2008 | Bartley et al. | 710/307 |
| 2009/0234943 A1 * | 9/2009 | Gyo et al. | 709/224 |

OTHER PUBLICATIONS

P. Pietzuch et al. "Network-aware operator placement for stream processing systems", In ICDE, pp. 49, 2006.

(Continued)

*Primary Examiner* — Phuoc Nguyen
(74) *Attorney, Agent, or Firm* — Law Offices of Ira D. Blecker, P.C.

(57) ABSTRACT

Method, system and computer readable program code for dynamic and evolutionary component placement in an event processing system having producers, consumers, a plurality of nodes between the producers and the consumers, and a flow graph representing operator components to be executed between the producers and the consumers. A description of a change to the system is received. At each node, next-hop neighbor nodes for each consumer are identified. A routing value is assigned to each next-hop neighbor node for each consumer and the routing values are updated according to an update rule that represents a chromosome in a routing probe. The update rule in a routing probe is selectively updated from a plurality of update rules at the consumer. The probability of selecting a particular update rule is reinforced or decayed based on the success of an update rule in allowing routing probes to create many different efficient routes. At each producer, nests of scouting probes are adaptively selected from an available set of nests and dispatched to execute hypothetical placement of a query by an independent agent called a "leader". A placement of the operator components that minimizes performance cost of the system relative to the hypothetical placement is selected. Each scouting probe contains chromosomes that guide placement. Scouting probes in two different nests have different chromosomes. The performance cost of the hypothetical changed placement is evaluated and the performance evaluation is used to evolve at least one chromosome of a scouting ant in each nest.

27 Claims, 10 Drawing Sheets

OTHER PUBLICATIONS

Y. Zhou et al., "Efficient Dynamic Operator Placement in a Locally Distributed Continuous Query System", Proceedings of the 14th International Conference on Cooperative Information Systems, Montpellier, France, Nov. 2006, pp. 54-71, LNCS 4275, Springer-Verlag.

V. Kumar et al., "Distributed Stream Management using Utility-Driven Self-Adaptive Middleware", In Proceedings of the Second international Conference on Automatic Computing (Jun. 13-16, 2005), ICAC. IEEE Computer Society, Washington, DC, 3-14.

C Chiu et al., "A Genetic Algorithm for Reliability-Oriented Task Assignment with k Duplications in Distributed Systems", Journal of Transactions on Reliability, vol. 55, No. 1., Mar. 2006.

M. Daoud et al., "An Efficient Genetic Algorithm for Task Scheduling in Heterogeneous Distributed Computng Systems", In IEEE Congress on Evolutionary Computation, Jul. 2006.

M. Solar et al., "Placement and routing of Boolean Functions in constrained FPGAs using a Distributed Genetic Algorithm and Local Search", In proceedings of Parallel and Distributed Processing Symposium (IPDPS), 2006.

M. Aldasht et al., "A Genetic Exploration of Dynamic Load Balancing Algorithms", Journal of Evolutionary Computation. vol. 1, Issue, Jun. 19-23, 2004 pp. 1158-1163 vol. 1.

H. Aguirre et al., "Improved Distributed Genetic Algorithm with Cooperative-Competitive Genetic Operators", IEEE International Conference on Systems, Man, and Cybernetics, 2000. vol. 5, Issue, 2000 pp. 3816-3822 vol. 5.

Y. Tsujimura et al., "Data Distribution Considered Communication Flow in Network Using Genetic Algorithm", IEEE International Conference on Knowledge-Based Intelligent Electronic Systems, 1998.

P. Maes, "Modeling Adaptive Autonomous Agents", Artificial Life, 1994.

N. Minar et al., "Cooperating Mobile Agents for Dynamic Network Routing", Software Agents for Future Communications Systems, 1999.

D. Rus et al., "Autonomous and Adaptive Agents that Gather Information", AAAI '96 International Workshop on Intelligent Adaptive Agents, 1996.

* cited by examiner

DYNAMIC AND EVOLUTIONARY PLACEMENT IN AN EVENT-DRIVEN COMPONENT-ORIENTED NETWORK DATA PROCESSING SYSTEM

BACKGROUND OF THE INVENTION

1. Field of the Invention

The present invention relates generally to the data processing field and, more particularly, to a decentralized computer implemented method, system and computer readable program code for dynamically optimizing component placement in an event-driven component-oriented network data processing system using evolutionary computation that is subject to changes in function, infrastructure and/or performance.

2. Background of the Invention

Component placement is an important factor in optimizing performance in an event-driven component-oriented network data processing system. Optimal component placement may be defined as placing components (for instance database query operators) in a flow onto an available set of machines in a network such that the placement minimizes the end-to-end latency for each path from producers to consumers of events.

Prior efforts that address the problem of component placement include the use of static centralized placement algorithms that are not responsive to changes that may occur in an event-driven component-oriented network data processing system. Such changes may include, for example:
  1. Changes in Function:
  a. Producers or consumers may be added or deleted.
  b. Components may be added, deleted or modified.
  2. Changes in performance characteristics:
  a. Message rates from producers may change.
  b. Data may change causing workload on different components to change.
  3. Changes in Infrastructure:
  a. Server capacities may change or servers may go on or off line.
  b. Links between servers may become congested or unavailable.

Known approaches to static distributed component placement include "biological" approaches in which component placement is described in terms of activities performed by a colony of ants. Published approaches for component placement in stream processing and complex event processing have not explored ant colony optimization schemes or genetic algorithms. Published work in genetic algorithms for dynamic task scheduling present centralized algorithms or decentralized algorithms that are not applicable to the application requirements of practical event-driven systems.

BRIEF SUMMARY OF THE INVENTION

In general, current approaches to component placement in a network data processing system are not fully satisfactory, and it would be desirable to provide a decentralized mechanism for dynamically optimizing component placement in an event-driven component-oriented network data processing system, using evolutionary computation, that is subject to changes in function, infrastructure and/or performance.

The various advantages and purposes of the present invention as described above and hereafter are achieved by providing, according to a first aspect of the invention, a computer implemented method for dynamic and evolutionary component placement in an event processing system that has at least one producer, at least one consumer, a plurality of nodes and a plurality of links between the at least one producer and the at least one consumer, and a flow graph that represents a plurality of operator components to be executed between the at least one producer and the at least one consumer, the computer implemented method running, in a decentralized manner without requiring any global state or centralized controller, on the plurality of nodes of the event processing system, comprising:

receiving a description of at least one change to the event processing system;

identifying, at each node of the plurality of nodes, a plurality of next-hop neighbor nodes for each at least one consumer;

assigning a routing value to each of the identified plurality of next-hop neighbor nodes for each at least one consumer to form routing values, and the routing values are updated according to an update rule where the update rule is adaptively selected in response to current network conditions from among a plurality of update rules available at the consumer, and the probability of selecting an update rule depends on the success of the update rule in allowing routing probes to create many different and efficient routes.

estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;

autonomously orchestrating, from each producer, hypothetical placement and evaluating the performance cost of the at least one hypothetical changed placement and on the basis of the evaluation autonomously evolving at least one parameter with respect to the at least one hypothetical placement in response to changes in the data, network or other characteristics to improve the performance cost of the at least one hypothetical placement; and responsive to the autonomously orchestrating and evaluating hypothetical placement, selecting a changed placement of the operator components of the flow graph that minimizes the performance cost of the event processing system relative to the at least one hypothetical changed placement.

According to a second aspect of the invention, there is provided a computer implemented method for dynamic and evolutionary component placement in an event processing system that has at least one producer, at least one consumer, a plurality of nodes and a plurality of links between the at least one producer and the at least one consumer, a plurality of routing probes and scouting probes, and a flow graph that represents a plurality of operator components to be executed between the at least one producer and the at least one consumer, the computer implemented method running, in a decentralized manner without requiring any global state or centralized controller, on the plurality of nodes of the event processing system, comprising:

receiving a description of at least one change to the event processing system;

identifying, at each node of the plurality of nodes, a plurality of next-hop neighbor nodes for each at least one consumer;

assigning a routing value to each of the identified plurality of next-hop neighbor nodes for each at least one consumer to form routing values, the routing values provided by at least one routing probe and are updated according to an update rule, and where the update rule is adaptively selected in response to current network, data and other conditions from among a plurality of update rules available at the consumer, and the probability of selecting an update rule depends on the success of the update rule in allowing routing probes to create many different and efficient routes.

estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;

autonomously dispatching, from each producer, diverse scouting probes with different parameters that conduct the hypothetical placement and autonomously evaluating the success of these parameters with respect to the scouting probes and evolving at least one parameter with respect to the scouting probes that conduct the at least one hypothetical placement in response to changes in the data, network or other characteristics in order to obtain scouting probes having the evolved at least one parameter that improve the performance cost of placement in the event processing system; and responsive to the autonomously orchestrating and evaluating, selecting a changed placement of the operator components of the flow graph that minimizes the performance cost of the event processing system relative to the at least one hypothetical changed placement.

According to a third aspect of the invention, there is provided a computer program product, comprising:

a computer recordable medium having computer readable program code for dynamic and evolutionary component placement in an event processing system that has at least one producer, at least one consumer, a plurality of nodes and a plurality of links between the at least one producer and the at least one consumer, a plurality of routing probes and scouting probes, and a flow graph that represents a plurality of operator components to be executed between the at least one producer and the at least one consumer, the computer implemented method running, in a decentralized manner without requiring any global state or centralized controller, on the plurality of nodes of the event processing system, the computer program product comprising:

computer readable program code configured for receiving a description of at least one change to the event processing system;

computer readable program code configured for identifying, at each node of the plurality of nodes, a plurality of next-hop neighbor nodes for each at least one consumer;

computer readable program code configured for assigning a routing value to each of the identified plurality of next-hop neighbor nodes for each at least one consumer to form routing values, the routing values provided by at least one routing probe and are updated according to an update rule, and where the update rule of routing values is adaptively selected in response to current network, data and other conditions from among a plurality of update rules available at the consumer;

computer readable program code configured for estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;

computer readable program code configured for autonomously dispatching, from each producer, diverse scouting probes with different parameters that conduct the hypothetical placement and autonomously evaluating the success of these parameters with respect to the scouting probes and evolving at least one parameter with respect to the scouting probes that conduct the hypothetical placement in response to changes in the data, network or other characteristics in order to obtain scouting probes having the evolved at least one parameter that improve the performance cost of placement in the event processing system; and responsive to the autonomously orchestrating and evaluating, computer readable program code configured for selecting a changed placement of the operator components of the flow graph that minimizes the performance cost of the event processing system relative to the at least one hypothetical changed placement.

According to a fourth aspect of the invention, there is provided a dynamic and evolutionary component placement system in an event processing system that has at least one producer, at least one consumer, a plurality of nodes and a plurality of links between the at least one producer and the at least one consumer, a plurality of routing probes and scouting probes, and a flow graph that represents a plurality of operator components to be executed between the at least one producer and the at least one consumer, the computer implemented method running, in a decentralized manner without requiring any global state or centralized controller, on the plurality of nodes of the event processing system, the dynamic and evolutionary component placement system comprising:

a receiver for receiving a description of at least one change to the event processing system;

an identifier for identifying, at each node of the plurality of nodes, a plurality of next-hop neighbor nodes for each at least one consumer;

an assignor for assigning a routing value to each of the identified plurality of next-hop neighbor nodes for each at least one consumer to form routing values, the routing values provided by at least one routing probe and are updated according to an update rule, and where the update rule of routing values is adaptively selected in response to current network, data and other conditions from among a plurality of update rules available at the consumer.

an estimator for estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;

a dispatcher for autonomously dispatching, from each producer, diverse scouting probes with different parameters that conduct the hypothetical placement and autonomously evaluating the success of these parameters with respect to the scouting probes and evolving at least one parameter with respect to the scouting probes that conduct the hypothetical placement in response to changes in the data, network or other characteristics in order to obtain scouting probes having the evolved at least one parameter that improve the performance cost of placement in the event processing system; and responsive to the autonomously orchestrating and evaluating, a selector for selecting a changed placement of the operator components of the flow graph that minimizes the performance cost of the event processing system relative to the at least one hypothetical changed placement.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

FIG. 3A illustrates a network data processing system, FIG. 3B illustrates a plurality of components to be placed in the network data processing system of FIG. 3A, and FIG. 3C illustrates a placement of the plurality of components of FIG. 3B in the network data processing system of FIG. 3A to form an event-driven component-oriented network data processing system.

FIG. 5A illustrates a forward portion of a routing operation from a producer to a consumer, and FIG. 5B illustrates a rearward portion of the routing operation from the consumer back to the producer.

DETAILED DESCRIPTION OF THE PREFERRED EMBODIMENT

Figure 1:
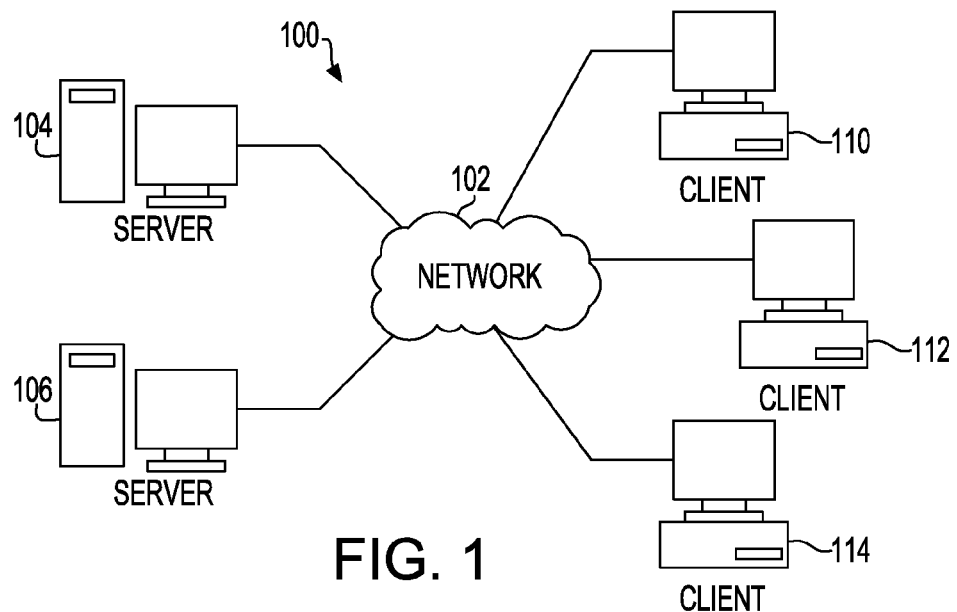
FIG. 1 depicts a pictorial representation of a network of data processing systems in which exemplary embodiments may be implemented.
Figure 2:
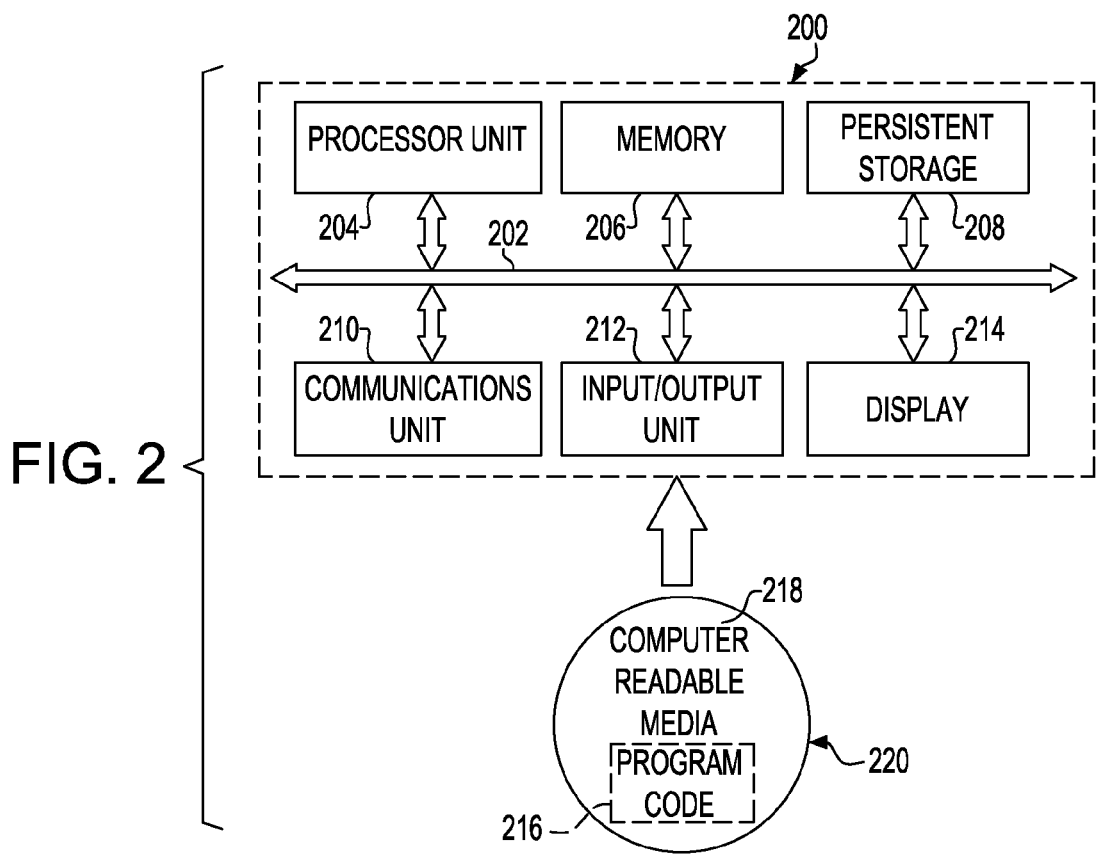
FIG. 2 is a diagram depicting a data processing system in accordance with an exemplary embodiment.

With reference now to the figures and in particular with reference to FIGS. 1-2, exemplary diagrams of data processing environments are provided in which exemplary embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which exemplary embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an exemplary embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 may be a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer readable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 may be any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3A:
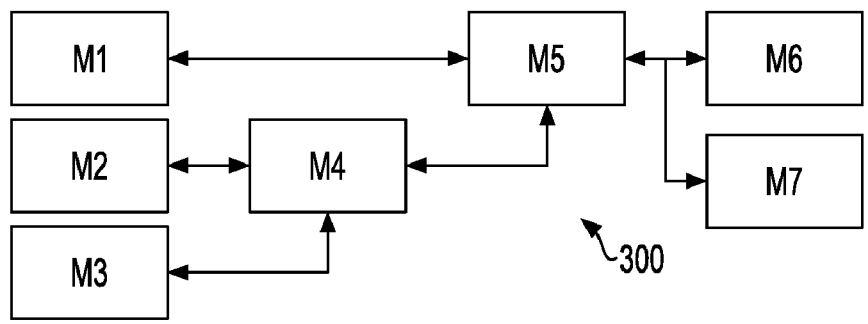
FIGS. 3A, 3B and 3C are diagrams that schematically illustrate component placement in a network data processing system to assist in explaining exemplary embodiments.
Figure 3B:
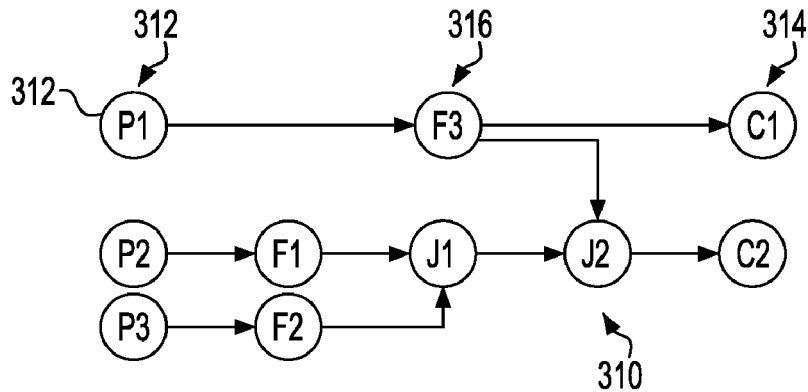
Figure 3C:
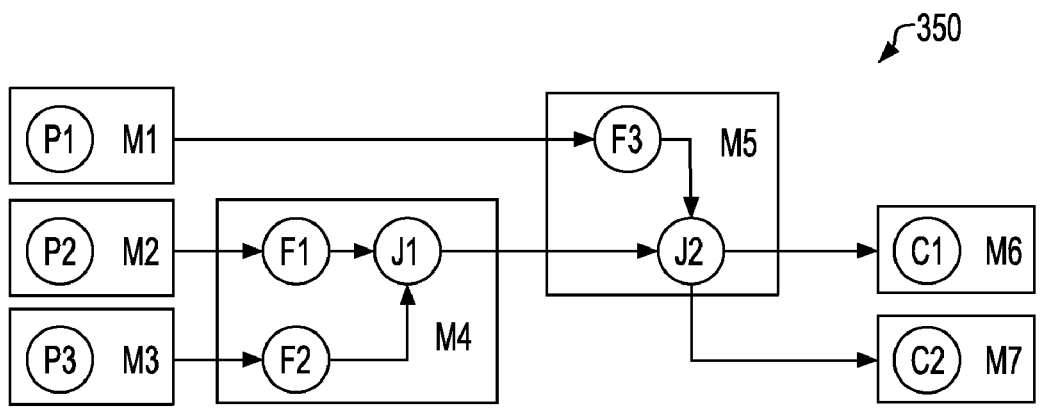

FIGS. 3A, 3B and 3C are diagrams that schematically illustrate component placement in a network data processing system. In Particular, FIG. 3A illustrates a network data processing system, FIG. 3B illustrates a flow graph of a plurality of components to be placed in the network data processing system of FIG. 3A, and FIG. 3C illustrates a placement of the plurality of components of FIG. 3B in the network data processing system of FIG. 3A to form an event-driven component-oriented network data processing system, also referred to herein an "event processing system.".

The network data processing system illustrated in FIG. 3A is designated by reference number 300, and includes a plurality of machines M1-M7, also referred to herein as "nodes", that are interconnected to one another as represented by the arrows in the figure. Network data processing system 300 may be implemented, for example, as network 100 in FIG. 1, and machines M1-M7 may be implemented, for example, as servers 104 and 106 and/or clients 110, 112 and 114 in FIG. 1. In FIG. 3A, data may flow from left to right or from right to left as indicated by the arrows in the figure.

FIG. 3B illustrates a plurality of components to be placed in network data processing system 300. The plurality of components is designated by reference number 310, and includes a plurality of producer components P1, P2 and P3, generally designated by reference number 312, and sometimes referred to herein as "producers"; a plurality of consumer components C1 and C2, generally designated by reference number 314, and sometimes referred to herein as "consumers"; and a plurality of operator components F1, F2, F3, J1 and J2, generally designated by reference number 316, and sometimes referred to herein as "operators".

Producer components 312 are producers or sources of data, and consumer components 314 are recipients of data supplied by the producer components. Operator components 316 are located between the producer components and the consumer components and perform various operations or tasks with respect to the data produced by the producer components such that each consumer component will receive appropriate data in an appropriate format. Operator components 316 may include, for example, filter operators F1, F2 and F3; and computation operators J1 and J2. The arrows connecting the various components in FIG. 3B schematically illustrate data flow paths from the various producer components to the various consumer components via the operator components to provide appropriate data to the consumer components.

FIG. 3C illustrates a placement of the plurality of components of FIG. 3B in the network data processing system of FIG. 3A to form an event-driven component-oriented network data processing system. The event-driven component-oriented data processing system is designated by reference number 350, and, as shown, includes producer components P1, P2 and P3 which are pinned to machines M1, M2 and M3, respectively, and consumer components C1 and C2 which are pinned to machines M6 and M7, respectively. In addition, operator components F1, F2 and J1 are placed in machine M4 and operator components F3 and J2 are placed in machine M5.

It should be understood that the arrangement and number of machines illustrated in FIG. 3A, the arrangement and the number of components illustrated in FIG. 3B, and the particular component placement illustrated in FIG. 3C are intended to be exemplary only. Network data processing system 300 may include any number of machines arranged in any desired manner, components 310 may comprise any number of components arranged in any desired manner, and the component placement illustrated in FIG. 3C can be varied in any desired manner.

When components, such as components 310 illustrated in FIG. 3B, are placed into an available set of machines in a network data processing system, such as network data processing system 300 in FIG. 3A, it is desirable that the placement be optimized so as to minimize end-to-end latency for each path of data flow from a producer to a consumer. Although the component placement in event-driven component-oriented network data processing system 350 illustrated in FIG. 3C may be optimal for the particular arrangement of components shown in FIG. 3A and the particular arrangement of machines illustrated in FIG. 3B, the component placement may not be optimal if one or more changes occur in system 350. Such changes that may occur include, for example:

1. Changes in Function:
   a. Producers or consumers may be added or deleted.
   b. Components may be added, deleted or modified.
2. Changes in Performance characteristics:
   a. Message rates from producers may change.
   b. Data may change causing workload on different operators to change.
3. Changes in Infrastructure
   a. Server capacities may change or servers may go on or off line.
   b. Links between servers may become congested or unavailable.

When one or more changes occur in an event-driven component-oriented network data processing system, a current component placement may no longer be optimal, and it may be desirable to adjust the component placement so as to maintain optimal performance notwithstanding the one or more changes.

Figure 4:
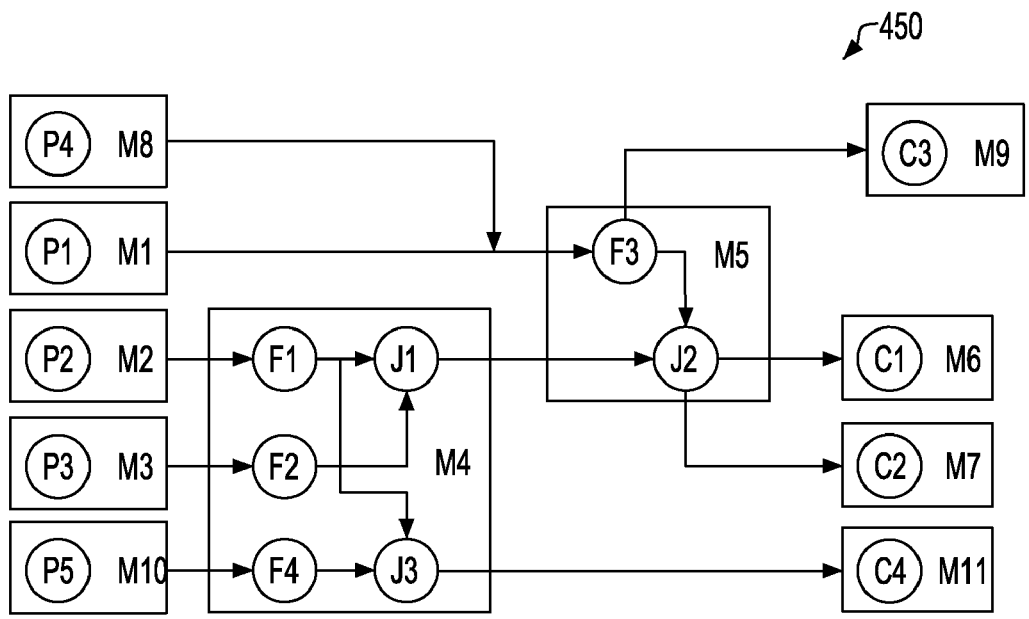
FIG. 4 is a diagram that illustrates a modified event-driven component-oriented network data processing system to assist in explaining exemplary embodiments.

FIG. 4 is a diagram that illustrates a modified event-driven component-oriented network data processing system to assist in explaining exemplary embodiments.

In particular, FIG. 4 illustrates an event-driven component-oriented network data processing system 450 that differs from event-driven component-oriented network data processing system 350 in FIG. 3C by including additional producer components P4 and P5 pinned in additional machines M8 and M10, respectively; additional consumer components C3 and C4 pinned in additional machines M9 and M11, respectively, and additional operator components F4 and J3. It would be desirable, in view of such changes, to adjust the placement of the operator components so as to maintain an optimal component placement. In FIG. 4, new operator components F4 and J3 have been placed in machine M4 while other operator components have been left unchanged.

In order to be able to effectively respond to changes in an event-driven component-oriented network data processing system, a mechanism is needed that can determine the component placement changes that are necessary to maintain optimum system operation and to then make the necessary changes dynamically at runtime in a distributed manner and without centralized control.

The foregoing related U.S. patent application Ser. No. 12/100,915 discloses an embodiment which utilizes a biologically-inspired algorithm in which task placement can be described in terms of activities performed by a colony of ants while searching for and locating food supplies, and in notifying other ants in the colony of the best paths to the food supplies. More particularly, exemplary embodiments provide a plurality of routing probes, corresponding to routing ants, which perform a routing operation to identify possible paths through a network from a producer (home) to a consumer (food supply), and assign routing values to each of the discovered paths representing the time taken to traverse the paths. A plurality of scouting probes (scouting ants) then estimates the performance cost of component placements at nodes along at least those paths that are designated by the routing values as being the best paths during a scouting operation. Components are then placed at nodes in the network in accordance with the results of the simulations so as to provide an optimal component placement. By continually performing the routing, scouting and placement operations, a component placement mechanism is able to dynamically adapt to changes in an event-driven component-oriented network data processing system to maintain optimal component placement notwithstanding changes in the system.

Figure 5A:
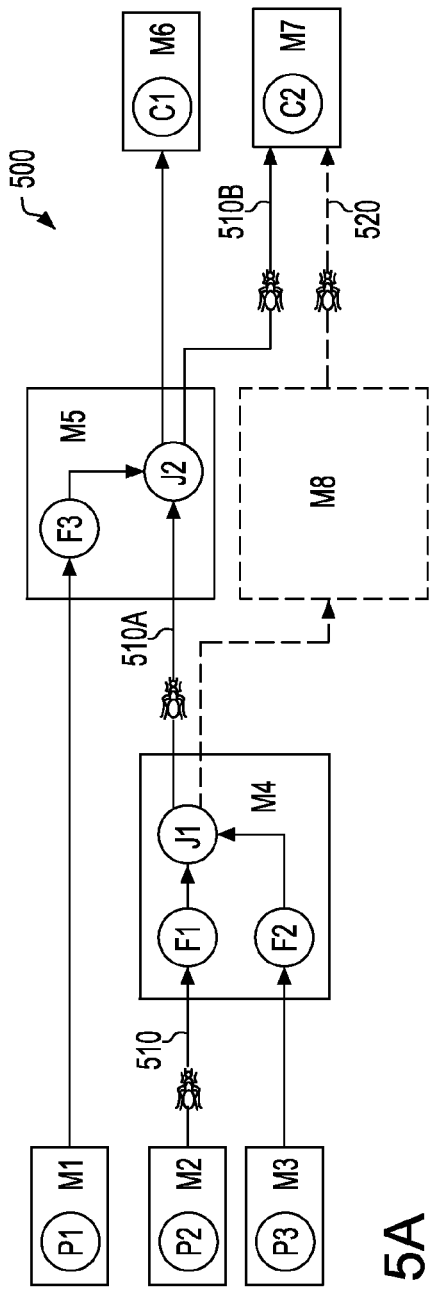
FIGS. 5A and 5B are diagrams that schematically illustrate a conventional routing operation.
Figure 5B:
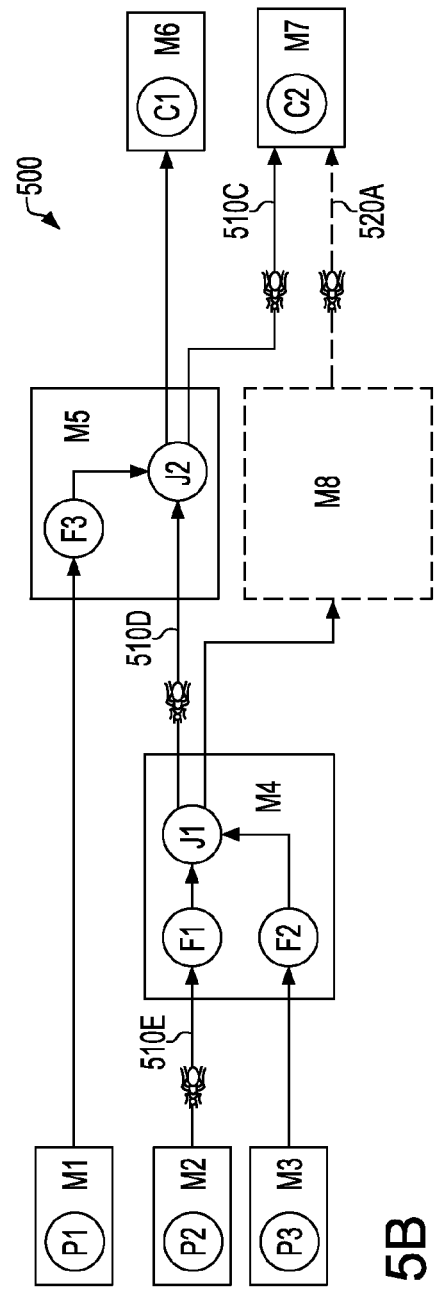

FIGS. 5A and 5B are diagrams that schematically illustrate a routing operation in accordance with the foregoing related U.S. patent application Ser. No. 12/100,915. FIG. 5A illustrates a forward portion of a routing operation, generally designated by reference number 500, from a producer to a consumer, and FIG. 5B illustrates a rearward portion of the routing operation from the consumer back to the producer. Referring to FIG. 5A, it is assumed that it is desired to transmit a message (query) from producer P2 in machine M2 to consumer C2 in machine M7. The goal is to send the message from P2 to C2 via the optimal path. To identify the optimal path, a routing operation is performed. According to an exemplary embodiment, the routing operation begins by producer P2 sending out a plurality of routing probes, one of the plurality of routing probes being represented in FIG. 5A by routing ant 510 in the ant colony analogy described herein.

Upon being released by producer P2, the routing probe first travels to node (machine) M4, and thereafter, from node M4 to node M5 (as shown at 510A), and then to consumer C2 in node M7 (as shown at 510B). Other routing probes may take other paths. For example, FIG. 5A also illustrates a second routing ant 520 that has taken a different path, via node M8, to consumer C2. As will be explained hereinafter, as routing probes move through the network, they select paths to consumer C2 based on routing values that have been assigned to different paths from one node to another by routing probes that have previously traveled through the network. Each routing probe uses the routing values at each node to make a probabilistic choice for each hop from one node to a next-hop neighbor node as it travels through the network.

Referring now to FIG. 5B, when each routing probe reaches consumer C2 at node M7, it turns around and retraces its path back to producer P2 at node M2. Thus, as shown in FIG. 5B, routing ant 510 travels from M7 to M5 (as shown at 510C), from M5 to M4 (as shown at 510D) and from M4 to M2 (as shown at 510E). Similarly, routing ant 520 also retraces its path back to M2 via node M8 as shown at 520A. As the routing ants (routing probes) travel from node to node during their return trip to M2, they deposit pheromones (i.e., update the routing values) at each node for the paths they have taken. In this way, the next routing probes that are sent out by P2 or another producer will have updated routing values to assist in selecting a path to C2 or to another consumer.

The "pheromones" deposited by the ants returning to the producer represent adjustments to a routing table that is provided at each node in the event-driven component-oriented network data processing system.

Figure 6:
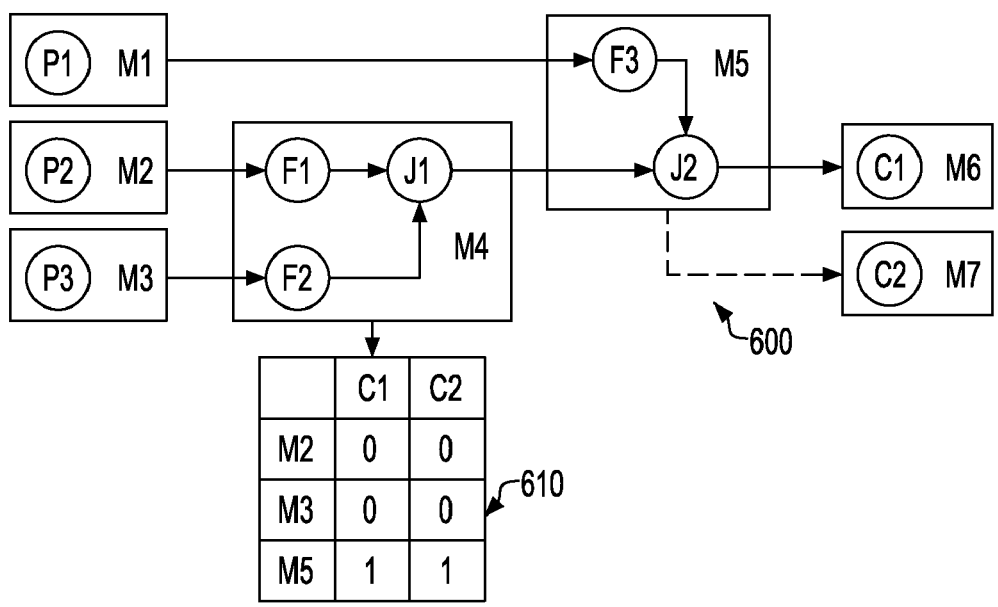
FIG. 6 is a diagram that schematically illustrates conventional use of a routing table in an event-driven component-oriented network data processing system.

FIG. 6 is a diagram that schematically illustrates use of a routing table in an event-driven component-oriented network data processing system in accordance with the foregoing related U.S. patent application Ser. No. 12/100,915. The event-driven component-oriented network data processing system is designated by reference number 600, and FIG. 6 illustrates routing table 610 at node M4 in the network. It should be understood that although not illustrated in FIG. 6, a routing table is also provided at node M5 in the network. A routing table may also be provided at one or more of producer machines M1, M2 and M3, if the producer machine has more than one outbound path, which is not the case in system 600 illustrated in FIG. 6. Consumer machines M6 and M7 are a final destination in system 600 and have no need for routing tables.

As shown in FIG. 6, routing table 610 includes entries representing the probabilities of choosing neighbor nodes M2, M3 and M5 as the next hop when going from machine M4 to either consumer C1 or C2. As shown in routing table 610, the probability of choosing nodes M2 or M3 as the next hop when going to either C1 or C2 is zero. On the other hand, the probability of choosing neighbor node M5 as the next hop from node M4 when going to node C1 is 1 and the probability of choosing node M5 as the next hop from node M4 when going to neighbor C2 is 1. Based on these routing values, routing probes are significantly more likely to travel to C1 or C2 via M5 than via M2 or M3.

Each routing probe will store (within itself) some information at every node it visits on its way from its source, a producer, to its destination, a consumer. This information is an information pair comprising a node ID and a time. When a routing probe reaches its destination, it turns backwards and retraces its steps as described previously, using the node information it had stored. As the routing probe retraces its path back to the producer, it updates the routing table values at every node (the values are a function of the time that it took the routing probe to go from the node to the consumer) using the time information it had stored. In this way, the table values are constantly updated with new probability values.

During a first scouting operation, because there is no prior information regarding paths to a consumer upon which to base a route selection, the paths are randomly selected. By releasing a sufficient number of routing probes, all possible paths will be tried, and highly accurate routing tables will gradually be developed at each node.

By releasing routing probes periodically or continuously, the routing tables will be periodically or continuously adjusted to reflect changes in the probabilities of traveling from a producer to a consumer via different paths. As a result, if there are any changes in the event-driven component-oriented network data processing system, for example, changes in function, performance characteristics or infrastructure, that might necessitate a change in the path from a producer to a consumer in order to maintain optimal performance, the routing probes will recognize such changes by virtue of traveling through the network, and automatically adjust the values in the routing tables at each node to reflect the changes.

Following a routing operation as described above, a scouting operation is performed to select locations for component placement in the network data processing system. During a scouting operation, a number of scouting probes are released from the query producer. These scouting probes are guided from the producer to the query consumer via paths identified by the routing probes. The scouts probabilistically select their paths, guided by the routing value concentrations for the next hop at each node, and proceed to simulate placement. Simulating placement is equivalent to estimating the performance cost of hypothetically placing the operator components on the nodes in the path the scouts chose to the destination node. Successful scouting probes memorize their path, and send a report back to the producer that details the results of their simulated placement. The producer records and compares all the reports sent by the scouting probes that it released. The producer selects the placement of the scouting probe that recorded the lowest performance cost and executes this placement by sending placement effectors to make the placement.

Optimal component placement considers the performance cost of placing operators on a given node, given stream data rates, queuing delay and processing delay on that node. A scouting probe will continue to hypothetically place operators on a given node as long as the estimated performance cost of the hypothetical placement is above an acceptable threshold. This is referred to herein as "greedy" component placement. Once a point has been reached where the estimated performance cost of hypothetically placing further operators on this node is not acceptable, the scouting probe probabilistically selects the next node in its path, guided by the routing values in the routing table. It will then attempt to hypothetically place the remaining operator components on the next node by doing greedy component placement.

In the foregoing related U.S. patent application Ser. No. 12/100,915, there is disclosed a biological solution for dynamic placement using ant-like messages wherein component placement is conducted through three species of ants: routing ants, scouting ants and enforcement ants. The "ants" are a biological term for the routing probes (routing ants), scouting probes (scouting ants) and enforcement probes (enforcement ants) that are used in the dynamic placement process. Routing ants establish optimal paths between the producer and a consumer of a query. They do this by laying and enforcing "pheromone trails" that are stored in a routing table in each node. Pheromone is a generic function that could incorporate a number of different parameters such as end-to-end latency or link bandwidth. Scouting ants utilize the pheromone concentrations to hypothetically place query operators for a given query. Scouts report the hypothetical placement and its estimated costs to the producer of the query. The producer of a query picks the scout with the best scouting report and sends enforcement ants to execute the placement outlined in the report. Ants run asynchronously in the background as the system receives and executes queries, data rates change and there are changes in the network topology. In this model there are several parameters that control placement that include:

1. Pheromone function. Paths between producers and consumers are a function of this metric.
2. $\alpha$, $\alpha \epsilon [0,1]$. $\alpha$ represents the load threshold. Scouting ants will continue placing operators on a node until this load threshold is reached. Normalization allows us to attain a load value within this range.
3. g, $g \epsilon [1, O_{max}]$, where $O_{max}$ is the maximum number of operators in a given query that the scout is responsible for placing. This parameter represents the ant's level of greediness in placement. It refers to the number of query operators a scout will attempt to hypothetically place on a machine unless the load threshold is reached.
4. $\beta$, $\beta \epsilon [0,1]$. $\beta$ represents the load migration factor. If the end-to-end latency of the hypothetical placement of a query is less than a factor $\beta$ of its most recently reported actual end-to-end latency, then the scout will induce the leader to execute the hypothetical placement and stop the current deployment of the query.

In the conventional dynamic placement system, these parameters have to be initialized by the user and they have to be updated by the user in response to changes in the network conditions.

In the present invention, the inventors have improved the biological approach to component placement in a network data processing system. In the present invention, the inventors propose a scheme to implement the above placement parameters (and others not mentioned herein) as ant "chromosomes" and "evolve" them through a decentralized genetic algorithm. Chromosomes are the "brains" of the ants and are parameters that are embedded in the ant. The chromosomes can change through an evolutionary process in response to changes in system conditions. There are several challenges involved in this endeavor.

One such challenge is decentralization. Traditionally genetic algorithms are centralized and compute static solutions. One main design challenge in combining a genetic algorithm with ant-based placement is to create a decentralized solution that is scalable. A single gene population cannot span the entire component network as it will take a very long time to evaluate the fitness of the population. Currently known methods for splitting the gene population by islands or other recently proposed methods are not applicable to event processing, the topic of the present invention. This is because producers and consumers of a query can span arbitrary parts of the network.

Another such challenge is fitness criteria and evaluation. It is not trivial to evaluate the quality of placement in a dynamic system where queries are being placed by multiple ants in an asynchronous manner because the placement of a query is influenced by multiple external factors. Selecting the load of a machine as the fitness criteria for instance would not provide accurate results because the machine's load is influenced by operators placed by different ants possessing different chromosomes as well as by network conditions such as data rates.

The goal of the present invention is to make placement adapt to the data, network, and load conditions. Due to the mutation and recombination components of the present genetic algorithm framework, a large set of ants with diverse placement strategies survive in each generation. The ants whose chromosomes lead to successful placements are more likely to survive and reproduce. Since distributed stream and event processing systems can have unanticipated changes in the infrastructure, a small amount of genetic diversity ensures that ants with new chromosomes continue to exist. Such ants become important should network conditions change to warrant their use. The computer implemented method, system and computer readable program code for dynamic and evolutionary component placement in an event processing system of the present invention is generic and allows any chromosome to be defined and added to the existing framework.

The present invention uses an evolutionary approach to achieve dynamic and adaptive placement results. Through the use of principles and mechanisms that nature has evolved over thousands of years, genetic algorithms can solve complex problems. In the present invention the performance of distributed ant agents in achieving placement of queries that have a common data source is autonomously orchestrated and evaluated by a leader residing at the data source. The evaluation of success is based on real-time information of the network conditions as reported by distributed ant agents. The leader then autonomously recombines the chromosomes of the best performing ants for a given set of queries to generate new chromosomes for ants responsible for placing these queries, and dispatches the new ants to execute this placement. Thus the leader uses the placement experience of ants to guide and evolve their placement technique for the future and thus continually adapts their behavior to changing network conditions. In addition to recombination, the leader also performs mutation in order to introduce and maintain genetic diversity and prevent the solution space from getting stuck into local minima. Since this process is periodic and new ant chromosomes are initialized at the beginning of each new generation, the system is dynamic, evolutionary and adaptive. And since it is the leader that evolves the placement technique, the system is autonomous.

The present invention has the following advantages over known solutions:

The present invention is distributed. Unlike previous genetic algorithms for file and task placement, the present algorithm does not require centralized coordination of the entire network. One of the contributions of the present invention is a method to incorporate genetic programming into a distributed event-driven component oriented system. Thus, the present algorithm can meet the scalability requirements of modern event-driven component oriented systems such as complex event processing systems and stream processing systems.

The present invention is adaptive. Unlike previous dynamic and adaptive solutions for component placement, the present algorithm is adaptive and incorporates learning into the decision logic. In the present invention ant colonies evolve in response to changing network conditions. Current performance is monitored in a distributed manner and is used to guide future placement.

The present invention is autonomous. Parameters to guide ant-based placement in the present invention are updated through distributed evolution of ant chromosomes. Existing algorithms for dynamic placement require user initialization of set thresholds. These algorithms do not have a method to update these thresholds in an autonomous way. The present algorithm circumvents this problem by incorporating a genetic algorithm that is run periodically to update placement parameters in the ant agents.

Figure 7:
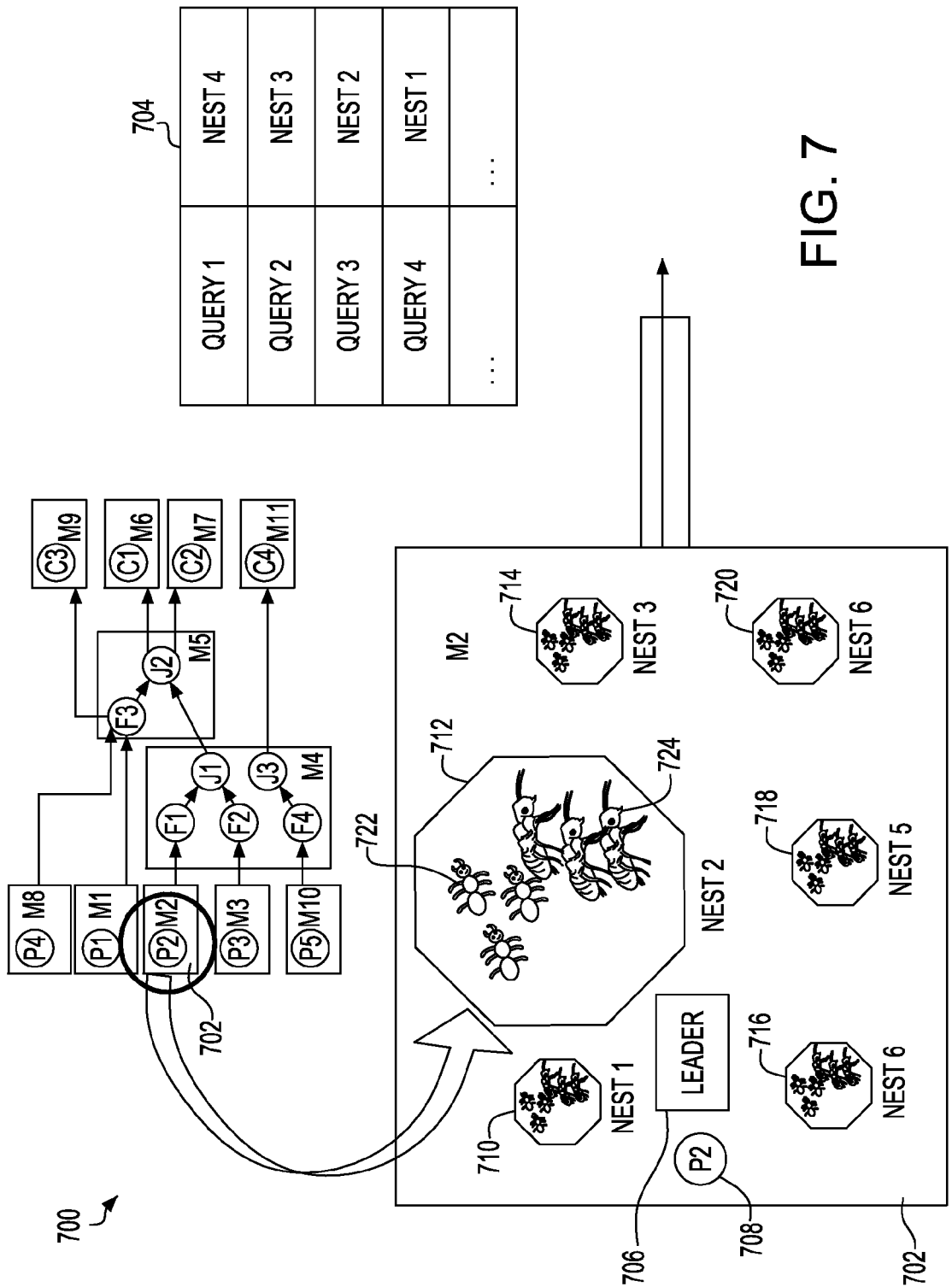
FIG. 7 is a diagram that schematically illustrates one node in an event-driven component-oriented network data processing system in which there is an ant leader and a plurality of ant nests according to an exemplary embodiment.

FIG. 7 shows a portion 700 of an event-driven component-oriented network data processing system, an enlarged view of node M2 702 and a routing table 704 for node M2 702. A query can have multiple data producers and a producer can serve as the data source for multiple queries. A leader resides at a producer p. A leader is a segment of software code that runs on each producer and is equivalent to the notion of a software agent, defined in artificial intelligence. A leader has a memory which stores knowledge of routing ants and scouting ants. A leader initiates and updates ant populations for each query that receives data from p. In particular, for a given query a leader will release routing ants and scouting ants to place that query or find alternative placements of a query that is already deployed. If a query has multiple producers, a leader residing at only one producer of the query will serve as the generation initiator for that query. FIG. 7 shows a leader 706 residing at producer P2 708 in a given network 700.

One can view the leader 706 as having access to different ant nests 710-720 where each nest contains a different species of ants. Each nest 710-720 contains scouting ants 722 and routing ants 724. Within each nest 710-720, all the scouting ants 722 are identical, i.e. they have the same chromosomes and all the routing ants 724 are identical. Two ants, each selected from two different nests always have different chromosomes. This allows for genetic diversity and provides the leader a plurality of choices for executing hypothetical placement. FIG. 7 shows six nests 710-720 that are accessible to the leader 706. For each query the leader 706 selects a nest to create routes using the routing ants 724 and do hypothetical placement for the query using the scouting ants 722. The routing table 704 in FIG. 7 shows the leader's selection of nests for a given query. After periodically repeating this procedure the leader 706 compares the performance of different nests by evaluating the performance of the query they placed, and selectively breeds ants (routing ants to routing ants and scouting ants to scouting ants) between nests to generate improved chromosomes for future placement of the same queries and newly arrived queries. Migration between leaders is also a possibility to provide genetic diversity.

Figure 9:
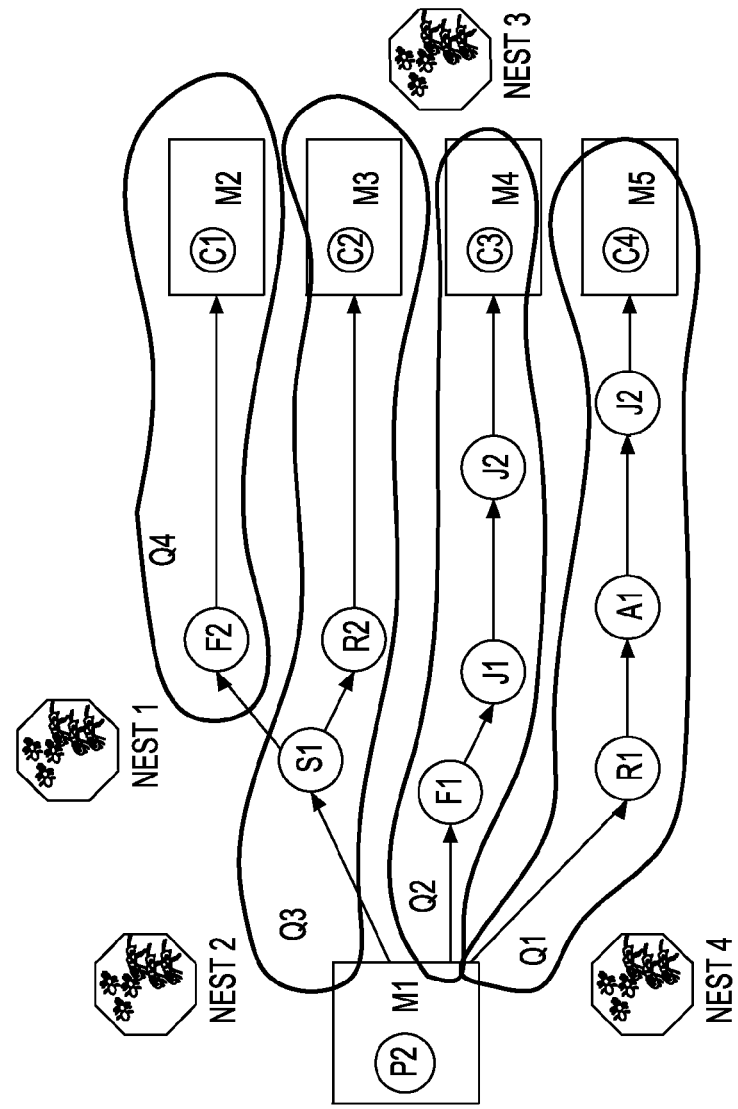
FIG. 9 schematically illustrates the dispatching of different nests of ants to run different subsets of a query.

For each query, ants 722, 724 are initialized with specific chromosomes that control the placement of that query. The leader 706 will select different chromosomes across queries. Thus, in a single generation, ants responsible for placing the same query will have the same chromosomes and ants responsible for placing a different query will have different chromosomes. This is illustrated in FIG. 9, where the leader selects nest 1 to place query Q4, selects nest 2 to place query Q3, selects nest 3 to place query Q2, and selects nest 4 to place query Q1. The leader's selection of nests for each query are shown in routing table 704 in FIG. 7. After periodically releasing routing and scouting ants for different queries over a period δ, the leader evaluates the success of the ant generation by comparing the performance of each query. On the basis of the evaluation, the leader selects nests that serve as building blocks for the next generation of ant nests. The leader will then apply a number of transformations to the set of chromosomes in this nest to generate chromosomes for nests containing the next ant generation.

A leader releases n scouting ants for a given query q after every time period of length δ. A scouting ant is initialized with the following chromosomes by the leader:

α, α∈[0,1]. α represents the load threshold. Scouting ants will continue placing operators on a node until this load threshold is reached. Normalization allows us to attain a load value within this range.

g, g ∈[1,$O_{max}$], where $O_{max}$ is the maximum number of operators in a given query that the scout is responsible for placing. This parameter represents the ant's level of greediness in placement. It refers to the number of query operators a scout will attempt to hypothetically place on a machine unless the load threshold is reached.

β, β∈[0,1]. β represents the load migration factor. If the end-to-end latency of the hypothetical placement of a query is less than a factor β of its most recently reported actual end-to-end latency, then the scout will induce the leader to execute the hypothetical placement and stop the current deployment of the query.

The foregoing α, g and β parameters represent chromosomes that collectively form the genetic material of an individual scouting ant. The scouting ants contain at least one parameter as a chromosome which is autonomously initialized and adaptively updated from time to time in response to changes in the network, data and other characteristics. The success of the chromosomes (parameters) is autonomously evaluated with respect to the scouting ants and at least one chromosome (parameter) is evolved with respect to the scouting ants that conduct the hypothetical placement in response to changes in the data, network or other characteristics in order to obtain scouting ants having the evolved at least chromosome (parameter) that improve the performance cost of placement.

Figure 8:
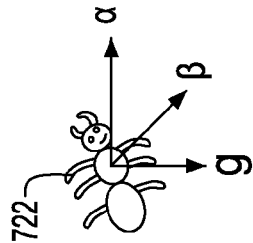
FIG. 8 schematically illustrates a scouting ant having a plurality of embedded chromosomes (i.e., parameters).

FIG. 8 illustrates an example of the chromosomes embedded in a scouting ant. FIG. 8 is for purposes of illustration and not limitation as other chromosomes in addition to the ones mentioned herein can be defined and embedded in the scouting ant.

There will now be discussed fitness parameters for scouting ants. The ant leader at a given node evaluates the effectiveness of the ants in achieving placement success by examining the following factors:

1. Success in placing a query (Quantitatively, this is 1 for success, and 0 for failure)
2. End-to-end latency of a placed query. (units are seconds or user defined).
3. Time to reach a stable query placement. (units are seconds or user defined).

The fitness score, s, is measured as some function, g, of a weighted combination of these factors and other user defined factors $f_1, \ldots, f_n$, where the weights are $k_i$ for $f_i$, respectively, where i ranges from 1 to n. If there is no success in placement, the fitness score is 0.

$$S = g\left(\sum_{i=1}^{i \leq n} k_i f_i\right)$$

Other factors depend upon optimization criteria relevant to the application goals. For instance if the objective function specified by the application is to execute placement functions that maximize the throughput of the system, where throughput can be defined as the total number of packets traveling through the system per second, then one of the fitness parameters will be the throughput of the placed query.

The end-to-end latency of a query also depends on the complexity of the query itself. By complexity we refer to the number of operators in the query, and the time taken to execute each operator. Therefore we can correct for this in order to prevent results from being biased by the complexity of different queries. We correct for this by dividing the end-to-end latency of a query executed on the actual network by the latency of that query if it were to execute on a single node. More specifically, this computation can be performed as follows. Let $L_n$ be the latency of executing query q on n machines and let $L_1$ be the latency of query q on one machine. In order to accurately compare the latency of queries of different levels of complexity. we can normalize the latency value, $L_n$ of each query q after it executes on a distributed network with n machines, as follows:

$$L_n' = \frac{L_n}{L_1}$$

The latency, $L_n$, of each query is initialized to its new normalized latency value, $L_n'$.

There will now be discussed the fitness evaluation for scouting ants. After an ant generation has been released for placing different queries over a given number of iterations, the ant leader residing at a producer of these queries evaluates the success of the ant generation across these queries according to the fitness function outlined above. That is, the effectiveness of the scouting probes in hypothetically placing all the operator components of the flow graph assigned to them is measured by the fitness score that is computed at each producer that released the scouting probes. The fitness score as noted above is a weighted combination of factors that represent the effectiveness of achieving placement success given current network and data conditions and the current flow graph by a scouting probe that include but are not limited to (a) success in placing all the operator components of the flow graph assigned to the scouting probe, (b) the performance cost of placement as defined by the objective function specified by the application and (c) time taken to place the operator components of the flow graph.

Figure 10:
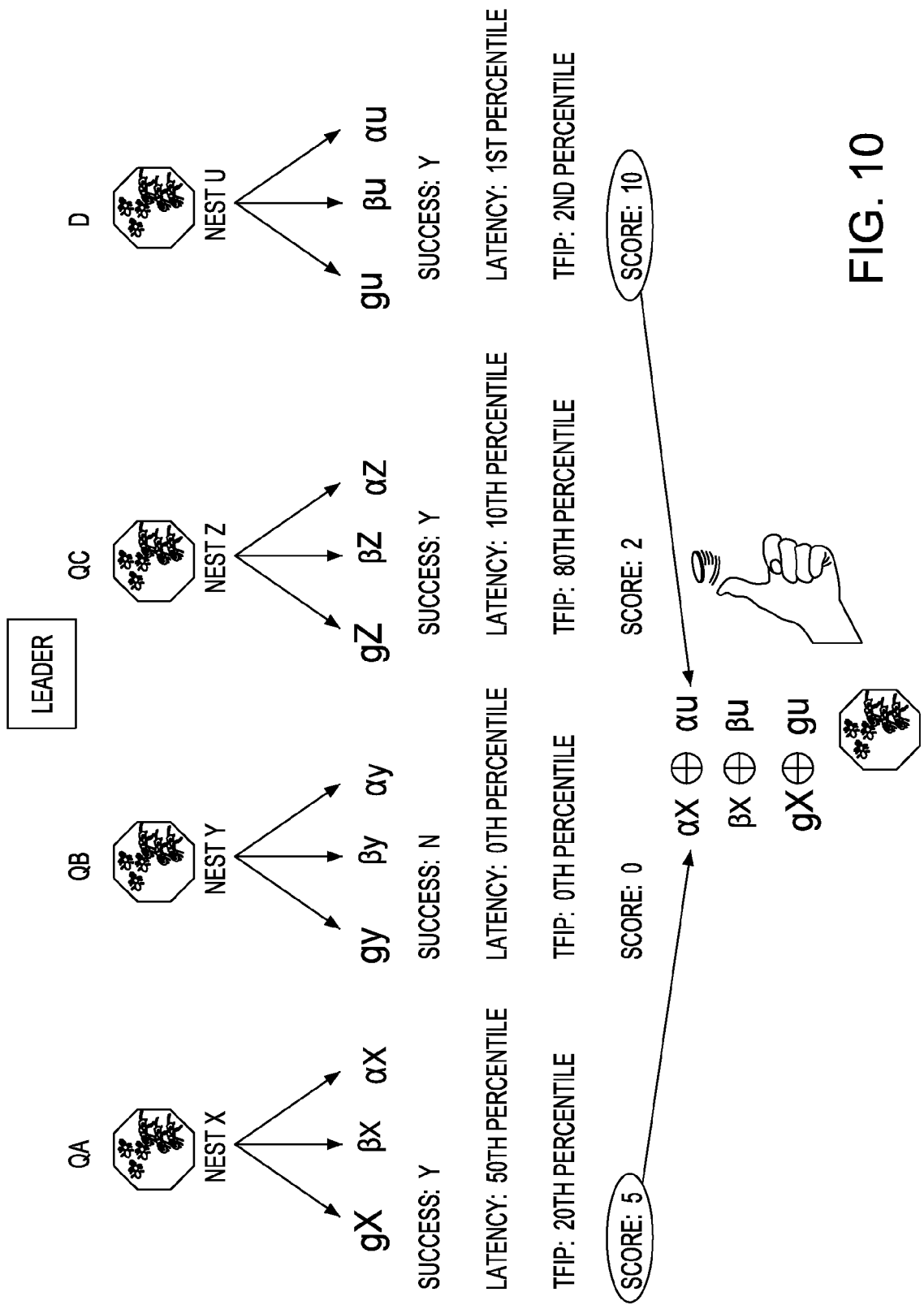
FIG. 10 schematically illustrates the fitness evaluation of scouting ants (i.e., scouting probes).

The fitness evaluation for scouting ants is further illustrated in FIG. 10, where the leader evaluates the success scores of nests X, Y, Z and U. The leader selects ants for reproduction which successfully place queries and have fitness scores greater than a preset fitness_threshold. In FIG. 10, the leader selects nests X and U for reproduction because their fitness scores are greater than the fitness_threshold, which is set to 4 (in this example). Then the leader initiates cross breeding in this subgroup. The breeding process involves recombining the genetic material, specifically the α, g and β values of two ants to produce ants with new values of α, g and β. Thus, in FIG. 10, the leader combines the chromosomes αx, gx and βx from the scouts in nest X, with the chromosomes αu, gu and βu from the scouts in nest U. The symbol, ⊕ in FIG. 10 represents the recombination function. In the case of recombination, the resulting new values for α, g and β have similarity in value with the values of α, g and β from nests X and U by being identical or some derived result of the combination of α, g and β from nests X and U.

Furthermore, the leader may also introduce mutation. With a small probability, the offspring also contain completely new values of α, g and β that do not come from either of the parents and are computed randomly. In FIG. 10, mutation is represented by the hand flipping a coin. Traditionally, the motivation for introducing mutation in genetic algorithms is to avoid getting stuck in local optima. In the framework of the present invention, mutation is particularly suitable. Stream processing applications typically run in unpredictable network conditions that include node failure and bursty data rates. Therefore it is unlikely that ants that are successful in achieving placement in the past will be able to successfully achieve placement in the future when network conditions change.

The reinforcement rule for routing ants will now be discussed. As described in the foregoing related U.S. patent application Ser. No. 12/100,915, routing ants update pheromones in routing tables on their way back from a consumer of a query to the producer of the query. There are a variety of potential pheromone update rule functions. These functions could be linear, quadratic or exponential. Details of the routing tables and how the ants initialize and update them are now provided.

First, the pheromone update rule will be explained then examples will be given of how the pheromone update rules can be modified.

The pheromone update rule consists of two rules: (1) a reinforcement rule and (2) a decay rule.

The pheromone value r carried by the routing ant is used by the current node i as positive reinforcement for the node i−1, where an ant on its backward path comes from on its way to node i. The ant turned backward from consumer d. The existing pheromone value in the table at time t, $r_{i-1,d}^{i}(t)$ can be increased by the new pheromone value r for time step (t+1) as follows:

$$r_{i-1,d}^{i}(t+1) = r_{i-1,d}^{i}(t) - r_{i-1,d}^{i}(t) \cdot r + r \quad \text{Linear Reinforcement Rule}$$

In this way the probability $r_{i-1,d}^{i}(t)$ will be increased by a value proportional to the reinforcement received and to the previous value of the node probability (that is, given a same reinforcement, small probability values are increased proportionally more than big probability values).

The pheromone entries $r_{n,d}^{i}(t)$ for destination d of the other neighboring nodes n of node i can implicitly receive negative reinforcement by normalization. Thus, in time step (t+1) their values are reduced so that the sum of probabilities will still be 1:

$$r_{n,d}^{i}(t+1) = r_{i-1,d}^{i}(t) - r_{i-1,d}^{i}(t) \cdot r, n \neq i-1 \quad \text{Linear Decay Rule}$$

The example of the pheromone reinforcement rule in the Linear Reinforcement Rule is linear in terms of r. Now consider a pheromone reinforcement rule that is quadratic in terms of r:

$$r_{i-1,d}^{i}(t+1) = r_{i-1,d}^{i}(t) - r_{i-1,d}^{i}(t) \cdot r^2 + r^2 \quad \text{Quadratic Reinforcement Rule}$$

Similarly, consider a pheromone decay rule that is also quadratic in terms of r:

$$r_{n,d}^{i}(t+1) = r_{i-1,d}^{i}(t) - r_{i-1,d}^{i}(t) \cdot r^2, n \neq i-1 \quad \text{Quadratic Decay Rule}$$

In this way, the pheromone update rules could be cubic, exponential or even some arbitrary multivariable function of the pheromone value r. It is not clear which update rule is the best. Therefore in the present invention we define the pheromone update rule as a chromosome embedded in a routing ant, and initialize an ant leader residing at a consumer with a selection of different pheromone update rules. As explained hereafter, reinforcement learning is exploited to enable the routing ant to make an informed selection of which pheromone update rule to use at a given point in time.

Figure 11:
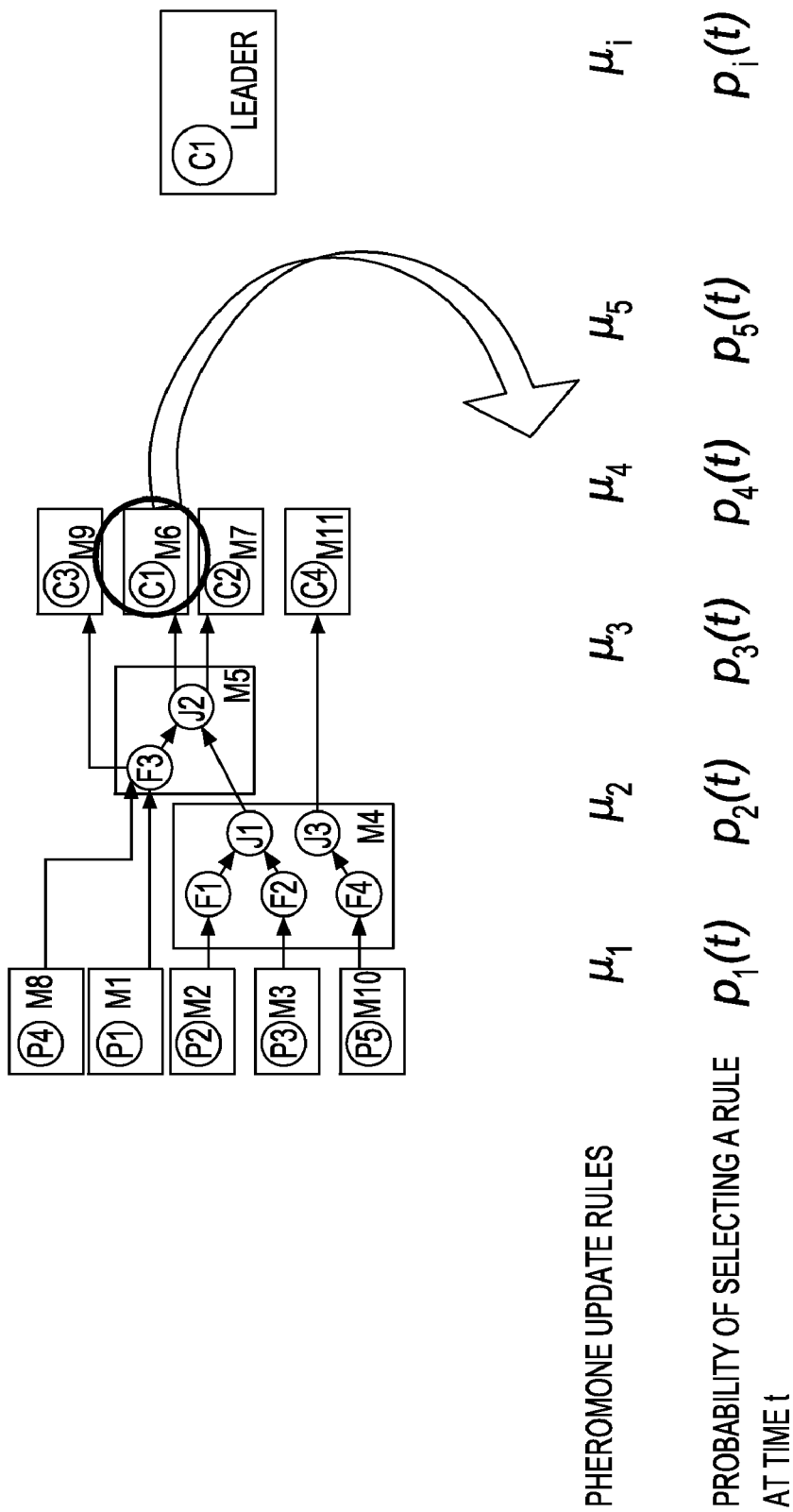
FIG. 11 schematically illustrates selection of an update rule for routing ants (i.e., routing probes).

A consumer in the component-oriented system has access to a set of possible pheromone update rules $\{u_1, \ldots, u_r\}$, where r is the total number of possible pheromone update rules. FIG. 11 shows the different pheromone update rules, $\{u_1, \ldots, u_r\}$, which are available to the leader residing at consumer C1. The consumer also has a probability vector $\vec{p}(t) = (p_1(t), \ldots, p_r(t))$, where $p_i(t)$ means the probability of pheromone update rule $u_i$ to be selected at time t. This is also illustrated in FIG. 11.

In the linear learning schemes, $f_j$ and $g_j$ are obtained in the following linear functions:

$$f_j(\vec{p}) = a p_j (j = 1, \ldots, r),$$

$$g_j(\vec{p}) = \frac{b}{r-1} - b p_j$$

where a and b are learning parameters.

The consumer updates the probability vector through reinforcement learning as follows:

If the pheromone update rule $u_i$ selected in time t leads to a success, then the probability for selecting the same pheromone update rule at time t+1 is reinforced:

$$p_i(t+1) = p_i(t) + \sum_{i \neq j}^{r} f_j(\vec{p}(t)),$$

and the probability for selecting some other pheromone update rule $u_j$ at time t+1 is penalized:

$$p_j(t+1) = p_j(t) - f_j(\vec{p}(t)) \ (\forall j \neq 1)$$

If the pheromone update rule $u_i$ selected in time t leads to failure, then the probability for selecting the same pheromone update rule at time t+1 is penalized:

$$p_i(t+1) = p_i(t) - \sum_{i \ne j}^{r} g_j(\vec{p}(t)),$$

and the probability for selecting some other pheromone update rule $u_j$ at time t+1 is reinforced:

$$p_j(t+1) = p_j(t) + g_j(\vec{p}(t)) \ (\forall j \ne 1)$$

The success of routing probes that provide the routing values is autonomously evaluated at a consumer and routing update rules for the routing probes are selected from one or more routing update rules that lead to greater success in placement of components than other rules given current network, data and other conditions. The success of routing probes is measured in a decentralized manner at a consumer that receives the routing probes by factors that include but are not limited to counting the number of scouts that reach the at least one consumer having hypothetically placed all the operator components of the flow graph assigned to them and by counting the number of different paths that scouts take. That is, a consumer evaluates success by counting the number of scouting ants that reach the consumer with a successful hypothetical placement and also by counting the number of different paths that scouting ants take. If a particular choice of pheromone update rule leads to a large number of potential paths to the consumer and is judiciously selected to support successful placement, then the consumer will reinforce the probability for selecting that rule for routing ants (seeking this consumer) in the next pheromone update rule selection stage.

Figure 12:
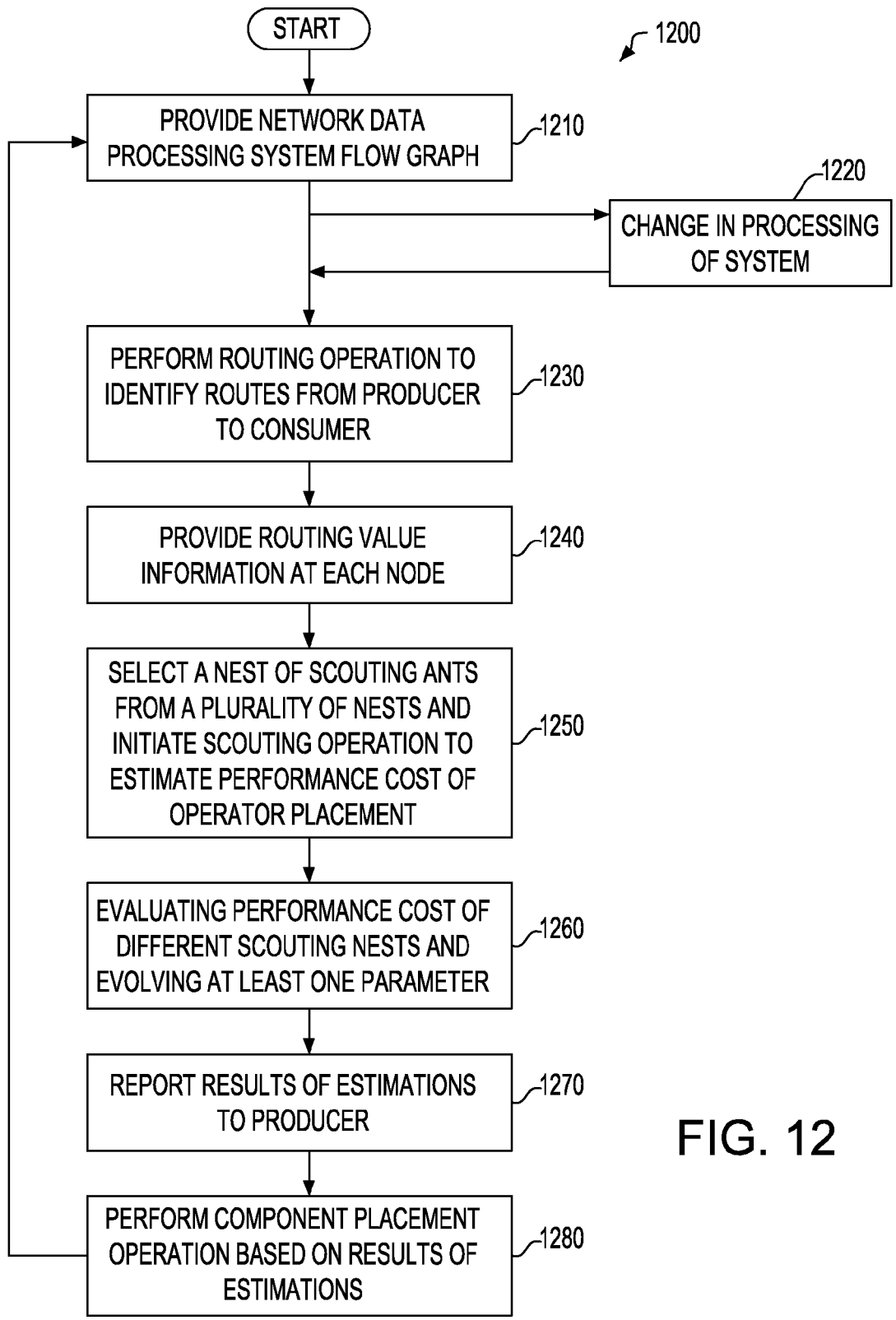
FIG. 12 is a flowchart that illustrates a method for dynamic, evolutionary and decentralized component placement in an event-driven component-oriented network data processing system according to an exemplary embodiment.

FIG. 12 is a flowchart that illustrates a method for dynamic and evolutionary component placement in an event-driven component-oriented network data processing system according to an exemplary embodiment. The method is designated by reference number 1200 and begins by providing an event-driven component-oriented network data processing system that includes at least one producer, at least one consumer, a plurality of nodes and a plurality of links between the at least one producer and the at least one consumer as well as a flow graph that consists of a series of operator components through which data should flow in a designated manner (Step 1210). Preferably, the processing system includes a plurality of routing probes and scouting probes. Any changes in network infrastructure, performance characteristics or flow graph are indicated (Step 1220). This is an optional step in that a change may or may not occur. A routing operation is then performed to identify each path from a producer of the at least one producer to a consumer of the at least one consumer (Step 1230). According to an exemplary embodiment, the routing operation includes identifying, at each node of the plurality of nodes, a plurality of next-hop neighbor nodes for each at least one consumer. Routing value information is then provided at each node (Step 1240). The routing values are preferably provided by at least one routing probe. According to an exemplary embodiment, a routing value is assigned to each of the identified plurality of next-hop neighbor nodes for each at least one consumer, and represents the amount of time required for routing probes to go from that node to the consumer via each route. The routing value could also represent other network related characteristics. The routing value information is updated according to the pheromone update rule. The pheromone update rule is adaptively selected in response to current network, data and other conditions from among a plurality of update rules available at the consumer. The probability of selecting one of these update rules from the plurality of update rules at the consumer is reinforced or decayed based on the success of a given update rule in creating many different and efficient routes. The efficiency criterion for a route is set according to the objective of the placement application.

A leader selects a nest of scouting ants from a plurality of nests at a producer and a scouting operation is then initiated to estimate the performance cost of placement of operators at nodes along at least one path of the plurality of paths identified during the routing operation (Step 1250). According to an exemplary embodiment, the estimate of the performance cost may be made using the routing values in the context of at least one change to the event processing system based on at least one hypothetical changed placement of the operator components of the flow graph at nodes along at least one path from a producer to a consumer through next-hop neighbor nodes for each at least one consumer.

Next, in one preferred embodiment, hypothetical placement is autonomously orchestrated (i.e., arranged) from each producer and the performance cost of the at least one hypothetical placement is evaluated. Also, there is autonomously evolved at least one parameter with respect to the at least one hypothetical placement in response to changes in the data, network or other characteristics to improve the performance cost of the at least one hypothetical placement is autonomously evolved. In another preferred embodiment, diverse scouting probes with different parameters that conduct the hypothetical placement are autonomously dispatched from each producer and the success of these parameters with respect to the scouting probes is autonomously evaluated. Also, there is autonomously evolved at least one parameter with respect to the scouting probes that conduct the at least one hypothetical placement in response to changes in the data, network or other characteristics in order to obtain scouting probes having the evolved at least one parameter that improves the performance cost of placement in the event processing system (Step 1260).

Results of the evaluations are then reported to the producer (Step 1270), and a component placement operation is performed based on the results of the estimations (Step 1280).

Following a component placement operation at Step 1280, the method returns to step 1210 to repeat the routing, scouting and component placement operations to reflect any changes that might occur in the event-driven component-oriented network data processing system.

Figure 13:
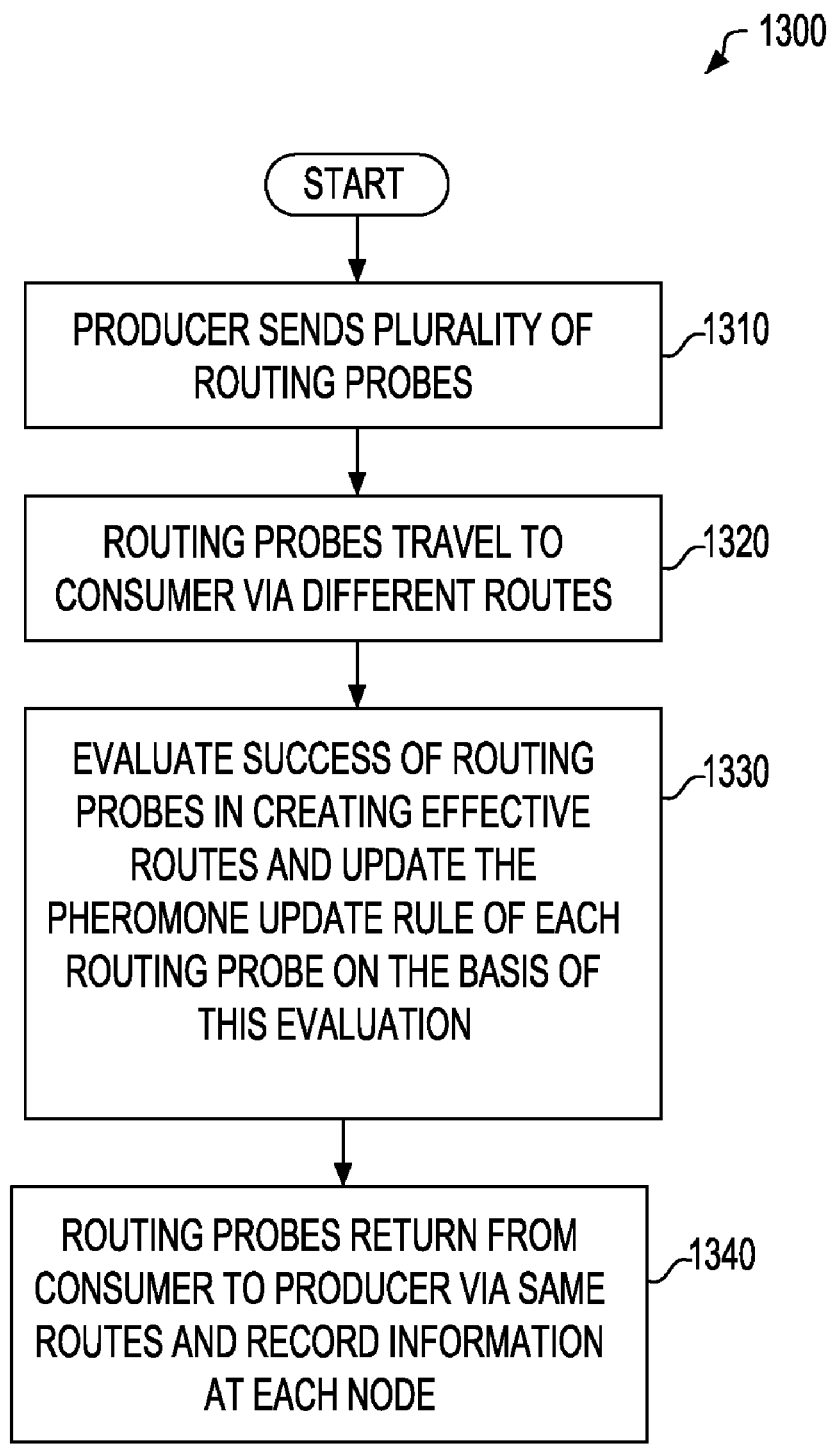
FIG. 13 is a flowchart that illustrates a routing operation in an event-driven component-oriented network data processing system according to an exemplary embodiment that evolves through reinforcement learning.

FIG. 13 is a flowchart that illustrates a routing operation in an event-driven component-oriented network data processing system according to an exemplary embodiment. The routing operation may be implemented, for example, as Step 1230 in FIG. 12. As shown, a producer sends out a plurality of routing probes (Step 1310). The plurality of routing probes travel to a consumer via different paths based upon the routing value information at each node in the network and each routing probe records some information at each step (Step 1320). After reaching the consumer, the pheromone update rule of each routing probe is adaptively re-selected from among a plurality of update rules available at the consumer. The probability of selecting one of these update rules from the plurality of update rules at the consumer is reinforced or decayed based on the success of a given update rule in creating many different and efficient routes. The efficiency criterion for a route is set according to the objective of the placement application. Thus the pheromone update rule is adaptively selected in response to changes in the network, data and other conditions. (Step 1330). Again, the update rule represents a chromosome in a routing probe and forms the genetic material of the routing probe. Each routing probe returns to the producer along the same route traveled to the consumer (Step 1340) so as to be able to provide routing value information gathered during the trip from the producer to the consumer to each node during the return trip from the consumer back to the producer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above in with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A computer implemented method for dynamic and evolutionary component placement in an event processing system that has at least one producer, at least one consumer, a plurality of nodes and a plurality of links between the at least one producer and the at least one consumer, and a flow graph that represents a plurality of operator components to be executed between the at least one producer and the at least one consumer, the computer implemented method running, in a decentralized manner without requiring any global state or centralized controller, on the plurality of nodes of the event processing system, comprising:

receiving a description of at least one change to the event processing system;

identifying, at each node of the plurality of nodes, a plurality of next-hop neighbor nodes for each at least one consumer;

assigning a routing value to each of the identified plurality of next-hop neighbor nodes for each at least one consumer to form routing values, and the routing values are updated according to an update rule where the update rule is adaptively selected in response to current network conditions from among a plurality of update rules available at the consumer, and the probability of selecting an update rule depends on the success of the update rule in allowing routing probes to create many different and efficient routes;

estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;

autonomously orchestrating, from each producer, hypothetical placement and evaluating the performance cost of the at least one hypothetical changed placement and on the basis of the evaluation autonomously evolving at least one parameter with respect to the at least one hypothetical placement in response to changes in the data, network or other characteristics to improve the performance cost of the at least one hypothetical placement; and responsive to the autonomously orchestrating and evaluating hypothetical placement, selecting a changed placement of the operator components of the flow graph that minimizes the performance cost of the event processing system relative to the at least one hypothetical changed placement.

2. A computer implemented method for dynamic and evolutionary component placement in an event processing system that has at least one producer, at least one consumer, a plurality of nodes and a plurality of links between the at least one producer and the at least one consumer, a plurality of routing probes and scouting probes, and a flow graph that represents a plurality of operator components to be executed between the at least one producer and the at least one consumer, the computer implemented method running, in a decentralized manner without requiring any global state or centralized controller, on the plurality of nodes of the event processing system, comprising:

receiving a description of at least one change to the event processing system;

identifying, at each node of the plurality of nodes, a plurality of next-hop neighbor nodes for each at least one consumer;

assigning a routing value to each of the identified plurality of next-hop neighbor nodes for each at least one consumer to form routing values, the routing values provided by at least one routing probe and are updated according to an update rule, and where the update rule is adaptively selected in response to current network, data and other conditions from among a plurality of update rules available at the consumer, and the probability of selecting an update rule depends on the success of the update rule in allowing routing probes to create many different and efficient routes;

estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;

autonomously dispatching, from each producer, diverse scouting probes with different parameters that conduct the hypothetical placement and autonomously evaluating the success of these parameters with respect to the scouting probes and evolving at least one parameter with respect to the scouting probes that conduct the at least one hypothetical placement in response to changes in the data, network or other characteristics in order to obtain scouting probes having the evolved at least one parameter that improve the performance cost of placement in the event processing system; and responsive to the autonomously orchestrating and evaluating, selecting a changed placement of the operator components of the flow graph that minimizes the performance cost of the event processing system relative to the at least one hypothetical changed placement.

3. The computer implemented method of claim 2 wherein the routing values provided by the at least one routing probe are assigned and updated by a plurality of update rules available at the at least one consumer.

4. The computer implemented method of claim 2 further comprising autonomously evaluating at a consumer the success of routing probes that provide the routing values and selecting routing update rules for the routing probes from one or more routing update rules that lead to greater success in placement of components than other rules given current network, data and other conditions.

5. The computer implemented method of claim 4 wherein the success of routing probes is measured in a decentralized manner at a consumer that receives the routing probes by factors that include but are not limited to counting the number of scouts that reach the at least one consumer having hypothetically placed all the operator components of the flow graph assigned to them and by counting the number of different paths that scouts take.

6. The computer implemented method of claim 2 wherein the effectiveness of the scouting probes in hypothetically placing all the operator components of the flow graph assigned to them is measured by a fitness score that is computed at each producer that released the scouting probes.

7. The computer implemented method of claim 6 wherein the fitness score is a weighted combination of factors that represent the effectiveness of achieving placement success given current network and data conditions and the current flow graph by a scouting probe that include but are not limited to (a) success in placing all the operator components of the flow graph assigned to the scouting probe, (b) the performance cost of placement as defined by the objective function specified by the application and (c) time taken to place the operator components of the flow graph.

8. The computer implemented method of claim 2 wherein the scouting probes contain at least one parameter defined as a chromosome in the scouting probes.

9. The computer implemented method of claim 2 wherein the scouting probes contain at least one parameter which is autonomously initialized and adaptively updated from time to time in response to changes in the network, data and other characteristics.

10. The computer implemented method of claim 2 wherein the scouting probes contain at least one parameter and two scouting probes may be combined to result in a third scouting probe wherein the at least one parameter of one of the two scouting probes is a first parameter and the at least one parameter of the other of the two scouting probes is a second parameter and the at least one parameter of the third scouting probe is a third parameter, the first and second parameters being combined to form the third parameter.

11. The computer implemented method of claim 9 wherein the third parameter has similarity in values with the first and second parameters by being identical or some derived result of the combination of the first and second.

12. The computer implemented method of claim 9 wherein the third parameter has no similarity in values with the first and second parameters and is computed randomly.

13. The computer implemented method of claim 8 wherein the parameters are selected from the group consisting of a threshold of acceptable computational load on a one node (load threshold), limit on the number of operator components in a query to hypothetically place on one node, a threshold which if exceeded allows the operator components of the flow graph to be migrated from the node where they are currently hosted to a new node in the network (load migration factor) and combinations thereof.

14. The computer implemented method of claim 2 wherein the update rule is embedded in the at least one routing probe.

15. A computer program product, comprising:
a tangible computer storage medium having computer readable program code for dynamic and evolutionary component placement in an event processing system that has at least one producer, at least one consumer, a plurality of nodes and a plurality of links between the at least one producer and the at least one consumer, a plurality of routing probes and scouting probes, and a flow graph that represents a plurality of operator components to be executed between the at least one producer and the at least one consumer, the computer implemented method running, in a decentralized manner without requiring any global state or centralized controller, on the plurality of nodes of the event processing system, the computer program product comprising:
computer readable program code configured for receiving a description of at least one change to the event processing system;
computer readable program code configured for identifying, at each node of the plurality of nodes, a plurality of next-hop neighbor nodes for each at least one consumer;
computer readable program code configured for assigning a routing value to each of the identified plurality of next-hop neighbor nodes for each at least one consumer to form routing values, the routing values provided by at least one routing probe and are updated according to an update rule, and where the update rule of routing values is adaptively selected in response to current network, data and other conditions from among a plurality of update rules available at the consumer;
computer readable program code configured for estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;
computer readable program code configured for autonomously dispatching, from each producer, diverse scouting probes with different parameters that conduct the hypothetical placement and autonomously evaluating the success of these parameters with respect to the scouting probes and evolving at least one parameter with respect to the scouting probes that conduct the hypothetical placement in response to changes in the data, network or other characteristics in order to obtain scouting probes having the evolved at least one parameter that improve the performance cost of placement in the event processing system; and
responsive to the autonomously orchestrating and evaluating, computer readable program code configured for selecting a changed placement of the operator components of the flow graph that minimizes the performance cost of the event processing system relative to the at least one hypothetical changed placement.

16. The computer program product of claim 15 further comprising computer readable program code configured for autonomously evaluating at a consumer the success of routing probes that provide the routing values and selecting routing update rules for the routing probes from one or more routing update rules that lead to greater success in placement of components than other rules given current network, data and other conditions.

17. The computer program product of claim 16 wherein the success of routing probes is measured in a decentralized manner at a consumer that receives the routing probes by factors that include but are not limited to counting the number of scouts that reach the at least one consumer having hypothetically placed all the operator components of the flow graph assigned to them and by counting the number of different paths that scouts take.

18. The computer program product of claim 15 wherein the effectiveness of the scouting probes in hypothetically placing all the operator components of the flow graph assigned to them is measured by a fitness score that is computed at each producer that released the scouting probes.

19. The computer program product of claim 18 wherein the fitness score is a weighted combination of factors that represent the effectiveness of achieving placement success given current network and data conditions and the current flow graph by a scouting probe that include but are not limited to (a) success in placing all the operator components of the flow graph assigned to the scouting probe, (b) the performance cost of placement as defined by the objective function specified by the application and (c) time taken to place the operator components of the flow graph.

20. The computer program product of claim 15 wherein the scouting probes contain at least one parameter embedded in the scouting probes.

21. The computer program product of claim 15 wherein the scouting probes contain at least one parameter which is autonomously initialized and adaptively updated from time to time in response to changes in the network, data and other characteristics.

22. The computer program product of claim 15 wherein the scouting probes contain at least one parameter and two scouting probes may be combined to result in a third scouting probe wherein the at least one parameter of one of the two scouting probes is a first parameter and the at least one parameter of the other of the two scouting probes is a second parameter and the at least one parameter of the third scouting probe is a third parameter, the first and second parameters being combined to form the third parameter.

23. The computer program product of claim 22 wherein the third parameter has similarity in values with the first and second parameters by being identical or some derived result of the combination of the first and second.

24. The computer program product of claim 22 wherein the third parameter has no similarity in values with the first and second parameters and is computed randomly.

25. The computer program product of claim 21 wherein the parameters are selected from the group consisting of a threshold of acceptable computational load on a one node (load threshold), limit on the number of operator components in a query to hypothetically place on one node, a threshold which if exceeded allows the operator components of the flow graph to be migrated from the node where they are currently hosted to a new node in the network (load migration factor) and combinations thereof.

26. The computer program product of claim 15 wherein the update rule is embedded in the at least one routing probe.

27. A dynamic and evolutionary component placement system in an event processing system that has at least one producer, at least one consumer, a plurality of nodes and a plurality of links between the at least one producer and the at least one consumer, a plurality of routing probes and scouting probes, and a flow graph that represents a plurality of operator components to be executed between the at least one producer and the at least one consumer, the computer implemented method running, in a decentralized manner without requiring any global state or centralized controller, on the plurality of nodes of the event processing system, the dynamic and evolutionary component placement system comprising:

a receiver for receiving a description of at least one change to the event processing system;

an identifier for identifying, at each node of the plurality of nodes, a plurality of next-hop neighbor nodes for each at least one consumer;

an assignor for assigning a routing value to each of the identified plurality of next-hop neighbor nodes for each at least one consumer to form routing values, the routing values provided by at least one routing probe and are updated according to an update rule, and where the update rule of routing values is adaptively selected in response to current network, data and other conditions from among a plurality of update rules available at the consumer;

an estimator for estimating, using the routing values in a context of the at least one change to the event processing system, a performance cost of the event processing system based on at least one hypothetical changed placement of the operator components of the flow graph at nodes along at least one path from a producer to a consumer through the next-hop neighbor nodes for each at least one consumer;

a dispatcher for autonomously dispatching, from each producer, diverse scouting probes with different parameters that conduct the hypothetical placement and autonomously evaluating the success of these parameters with respect to the scouting probes and evolving at least one parameter with respect to the scouting probes that conduct the hypothetical placement in response to changes in the data, network or other characteristics in order to obtain scouting probes having the evolved at least one parameter that improve the performance cost of placement in the event processing system; and responsive to the autonomously orchestrating and evaluating, a selector for selecting a changed placement of the operator components of the flow graph that minimizes the performance cost of the event processing system relative to the at least one hypothetical changed placement.

* * * * *